US010397941B2

(12) United States Patent
Lee et al.

(10) Patent No.: US 10,397,941 B2
(45) Date of Patent: Aug. 27, 2019

(54) METHOD OF TRANSMITTING AND RECEIVING UPLINK SIGNAL IN WIRELESS COMMUNICATION SYSTEM AND APPARATUS THEREFOR

(71) Applicant: LG ELECTRONICS INC., Seoul (KR)

(72) Inventors: Hyunho Lee, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 15/675,648

(22) Filed: Aug. 11, 2017

(65) Prior Publication Data

US 2018/0049228 A1    Feb. 15, 2018

Related U.S. Application Data

(60) Provisional application No. 62/373,985, filed on Aug. 12, 2016, provisional application No. 62/459,469, filed on Feb. 15, 2017.

(51) Int. Cl.
*H04W 72/12* (2009.01)
*H04W 72/04* (2009.01)
*H04L 5/00* (2006.01)
*H04W 72/14* (2009.01)
(Continued)

(52) U.S. Cl.
CPC ....... *H04W 72/1268* (2013.01); *H04L 5/0044* (2013.01); *H04L 5/0048* (2013.01); *H04W 72/0413* (2013.01); *H04W 72/1284* (2013.01); *H04W 48/08* (2013.01);
(Continued)

(58) Field of Classification Search
CPC ............ H04W 72/1268; H04W 76/15; H04W 72/0446; H04W 72/0413; H04W 72/14; H04W 72/0406; H04W 72/0453; H04W 72/1284; H04W 72/04; H04W 72/12; H04W 72/1205; H04L 1/1861;
(Continued)

(56) References Cited

U.S. PATENT DOCUMENTS 10,129,770 B2 * 11/2018 Yoo .................... H04L 1/001
2017/0149543 A1 * 5/2017 Ang .................... H04L 5/0007
2017/0223702 A1 * 8/2017 Yin .................... H04L 1/1812
(Continued)

*Primary Examiner* — Wutchung Chu
(74) *Attorney, Agent, or Firm* — Lee, Hong, Degerman, Kang & Waimey

(57) ABSTRACT

According to one embodiment of the present invention, a method of transmitting uplink, which is transmitted by a terminal in a wireless communication system, includes receiving a first control signal indicating a shortened transmission time interval (sTTI) or a symbol at which a common reference signal for demodulating data transmitted for a plurality of sTTIs is transmitted, receiving a second control signal including information indicating the plurality of sTTIs at which the data is transmitted, and transmitting the common reference signal at the indicated sTTI or symbol and transmitting the data for the plurality of the sTTIs according to first control signal and the second control signal. In this case, the information indicating the plurality of the sTTIs may include an interval of a sTTI unit or a symbol unit between the sTTI or symbol position at which the common reference signal is transmitted and the plurality of sTTIs.

12 Claims, 8 Drawing Sheets

(51) Int. Cl.
  *H04W 48/08*   (2009.01)
  *H04W 56/00*   (2009.01)
(52) U.S. Cl.
  CPC .... *H04W 56/0005* (2013.01); *H04W 72/0446* (2013.01); *H04W 72/14* (2013.01)
(58) Field of Classification Search
  CPC ..... H04L 5/001; H04L 5/0055; H04L 5/0048; H04L 5/0044; H04L 5/0053
  See application file for complete search history.

(56) References Cited

U.S. PATENT DOCUMENTS

| | | | |
|---|---|---|---|
| 2017/0295504 A1* | 10/2017 | Yoo | H04L 1/001 |
| 2018/0048451 A1* | 2/2018 | Yin | H04L 5/0055 |
| 2018/0049166 A1* | 2/2018 | Sun | H04W 72/042 |
| 2018/0049189 A1* | 2/2018 | Hugl | H04W 72/042 |
| 2018/0049226 A1* | 2/2018 | Chen | H04W 76/15 |
| 2018/0131490 A1* | 5/2018 | Patel | H04L 5/0051 |
| 2018/0131498 A1* | 5/2018 | Chen | H04L 5/0007 |
| 2018/0167172 A1* | 6/2018 | Hosseini | H04W 56/0045 |
| 2018/0183552 A1* | 6/2018 | Hosseini | H04L 5/0048 |
| 2018/0227955 A1* | 8/2018 | Hosseini | H04W 52/367 |
| 2018/0262307 A1* | 9/2018 | Shimezawa | H04L 5/1469 |
| 2018/0324018 A1* | 11/2018 | Hosseini | H04L 27/2613 |

\* cited by examiner

METHOD OF TRANSMITTING AND RECEIVING UPLINK SIGNAL IN WIRELESS COMMUNICATION SYSTEM AND APPARATUS THEREFOR

Pursuant to 35 U.S.C. § 119(a), this application claims the benefit of the U.S. Provisional Patent Application No. 62/373,985, filed on Aug. 12, 2016 and 62/459,469, filed on Feb. 15, 2017, which are all hereby incorporated by reference herein in their entirety.

BACKGROUND OF THE INVENTION

Field of the Invention

The present invention relates to a wireless communication system, and more particularly, to an apparatus for receiving and transmitting an uplink signal.

Discussion of the Related Art

In a next generation system, it may consider a situation that a TTI (transmission time interval) is variously configured for all or a specific physical channel to satisfy requirements in various application fields. More specifically, when communication is performed between an eNB and a UE, in order to reduce latency according to a scenario, it may be able to configure a TTI, which is used for transmitting such a physical channel as PDCCH (Physical Downlink Control CHannel), PDSCH (Physical Downlink Shared CHannel), PUSCH (Physical Uplink Shared CHannel), PUCCH (Physical Uplink Control CHannel), and the like, to be shorter than 1 msec. In the present specification, a channel of which the TTI is shorter than 1 msec can be referred to as sPDCCH, sPDSCH, sPUSCH, sPUCCH, respectively. And, a plurality of physical channels may exist in a single subframe (e.g., 1 msec) for a single UE or a plurality of UEs. In this case, each of a plurality of the physical channels may have a different TTI. In the following embodiments, for clarity, LTE system is explained as an example. In this case, a TTI corresponds to a size of a normal subframe in the LTE system and may correspond to 1 msec (hereinafter, a normal TTI). A short TTI corresponds to a TTI having a length shorter than the normal TTI. Each of the TTIs may correspond to a unit of a single OFDM symbol, a unit of a plurality of OFDM symbols, or a unit of an SC-FDMA symbol.

In the present specification, a UL structure for a sTTI, RS transmission, and the like are proposed.

SUMMARY OF THE INVENTION

Accordingly, the present invention is directed to an apparatus and method thereof that substantially obviate one or more problems due to limitations and disadvantages of the related art.

A technical task of the present invention is to provide a method of transmitting uplink or a method of receiving uplink. More specifically, the present invention intends to propose a method of transmitting uplink for a UE when a short TTI shorter than 1 msec is used.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting uplink, which is transmitted by a terminal in a wireless communication system, includes receiving a first control signal indicating a shortened transmission time interval (sTTI) or a symbol position at which a common reference signal for demodulating data transmitted for a plurality of sTTIs is transmitted, receiving a second control signal including information indicating the plurality of sTTIs at which the data is transmitted, and transmitting the common reference signal at the indicated sTTI or symbol position and transmitting the data for the plurality of sTTIs. In this case, the information indicating the plurality of sTTIs may include an interval of a sTTI unit or a symbol unit between the sTTI or symbol position at which the common reference signal is transmitted and the plurality of sTTIs.

Additionally or alternatively, the sTTI or symbol position at which the common reference signal is transmitted may be configured to be after a predetermined time is elapsed from a time instance at which the second control signal for scheduling a transmission of the data is received.

Additionally or alternatively, a length of the predetermine time may be determined according to whether or not the data is transmitted together with the common reference signal at the sTTI or symbol position at which the common reference signal is transmitted.

Additionally or alternatively, the second control signal may include bitmap information indicating a sTTI at which the data is transmitted among n sTTIs after the sTTI at which the common reference signal is transmitted, where n is an integer greater than or equal to one.

Additionally or alternatively, the second control signal may further include information indicating whether or not the data is transmitted together with the common reference signal.

Additionally or alternatively, the number of the plurality of sTTIs associated with the common reference signal can be configured in advance.

To further achieve these objects and other advantages and in accordance with the purpose of the invention, as embodied and broadly described herein, according to a different embodiment, a terminal for uplink transmission in a wireless communication system includes a transmitter and a receiver, and a processor controls the transmitter and the receiver, wherein the processor receives a first control signal indicating a shortened transmission time interval (sTTI) or a symbol position at which a common reference signal for demodulating data transmitted for a plurality of sTTIs is transmitted, receives a second control signal including information indicating the plurality of sTTIs at which the data is transmitted, transmits the common reference signal at the indicated sTTI or symbol position at which the common reference signal is transmitted and transmits the data at the plurality of sTTIs. In this case, the information indicating the plurality of sTTIs may include an interval of a sTTI unit or a symbol unit between the sTTI or symbol position at which the common reference signal is transmitted and the plurality of sTTIs.

Additionally or alternatively, the sTTI or symbol position at which the common reference signal is transmitted may be configured to be after a predetermined time is elapsed from a time instance at which the second control signal for scheduling a transmission of the data is received.

Additionally or alternatively, a length of the predetermine time may be determined according to whether or not the data is transmitted together with the common reference signal at the sTTI or symbol position at which the common reference signal is transmitted.

Additionally or alternatively, the second control signal may include bitmap information indicating a sTTI at which the data is transmitted among n sTTIs after the sTTI or symbol position at which the common reference signal is transmitted, where n is an integer greater than or equal to one.

Additionally or alternatively, the second control information may further include information indicating whether or not the data is transmitted together with the common reference signal.

Additionally or alternatively, the number of the plurality of sTTIs associated with the common reference signal may be configured in advance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
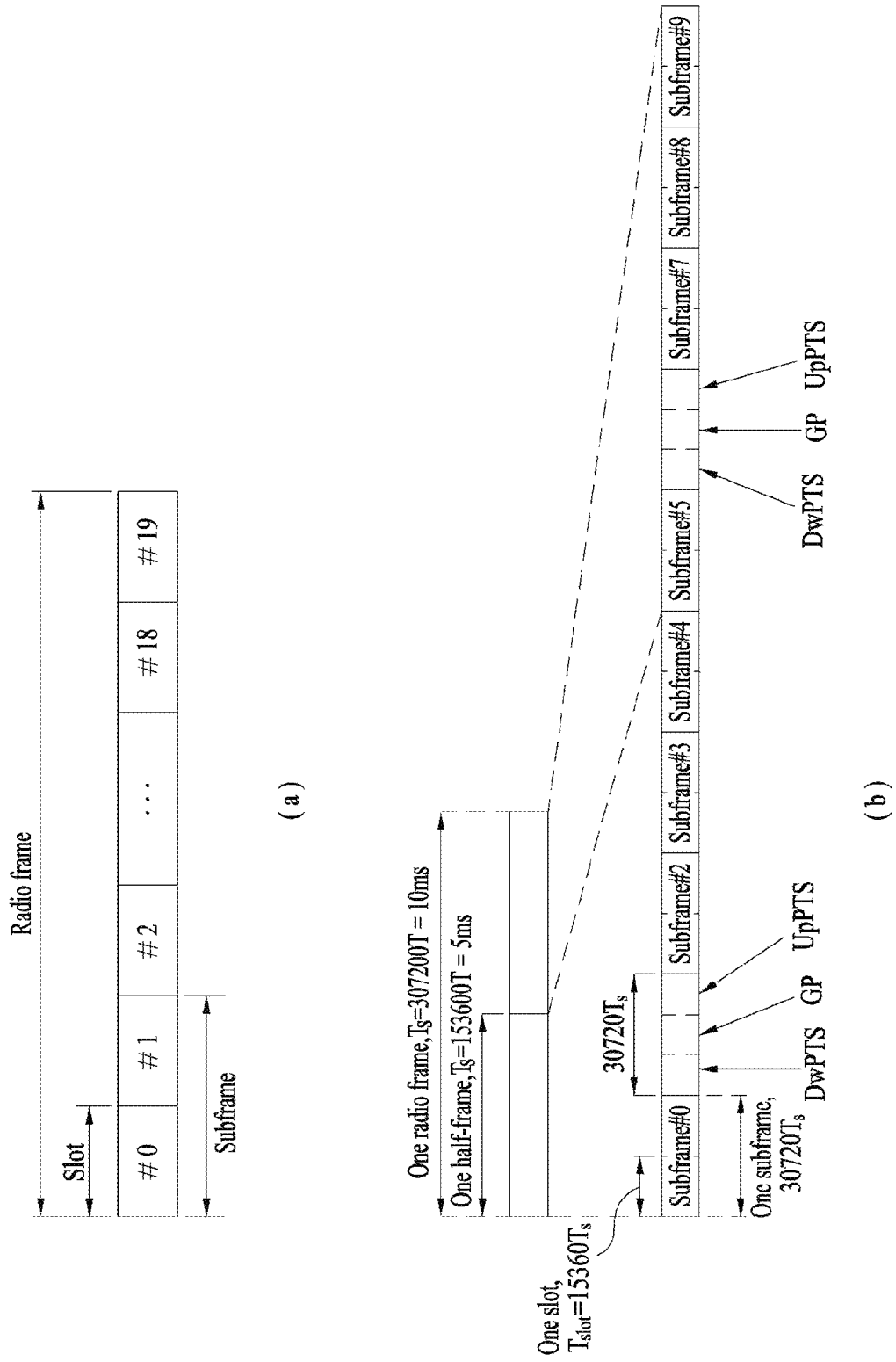
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
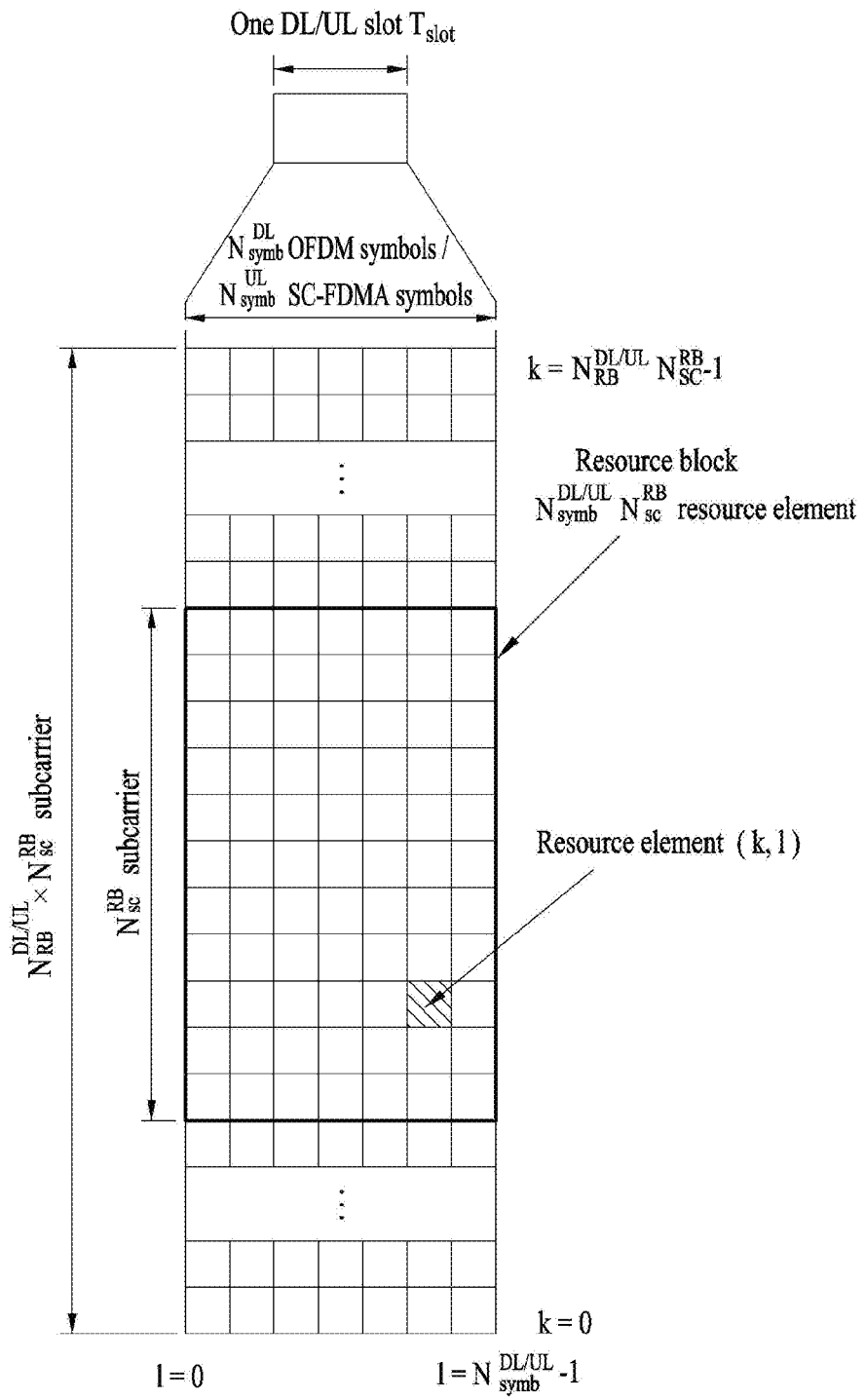
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
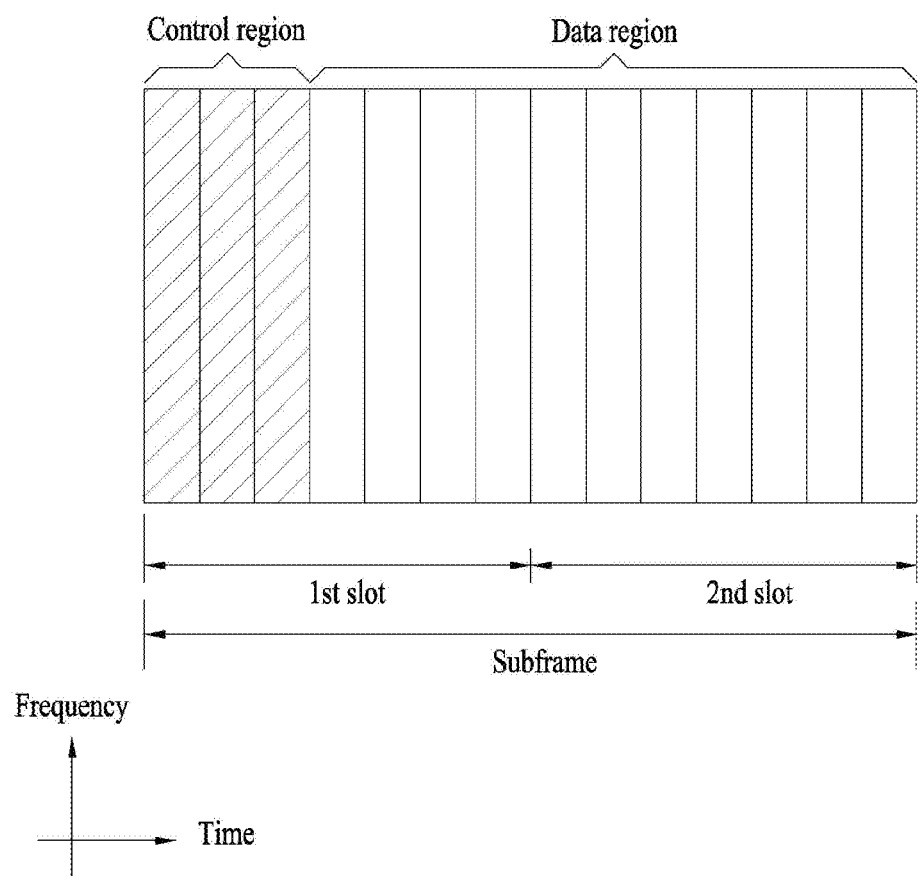
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
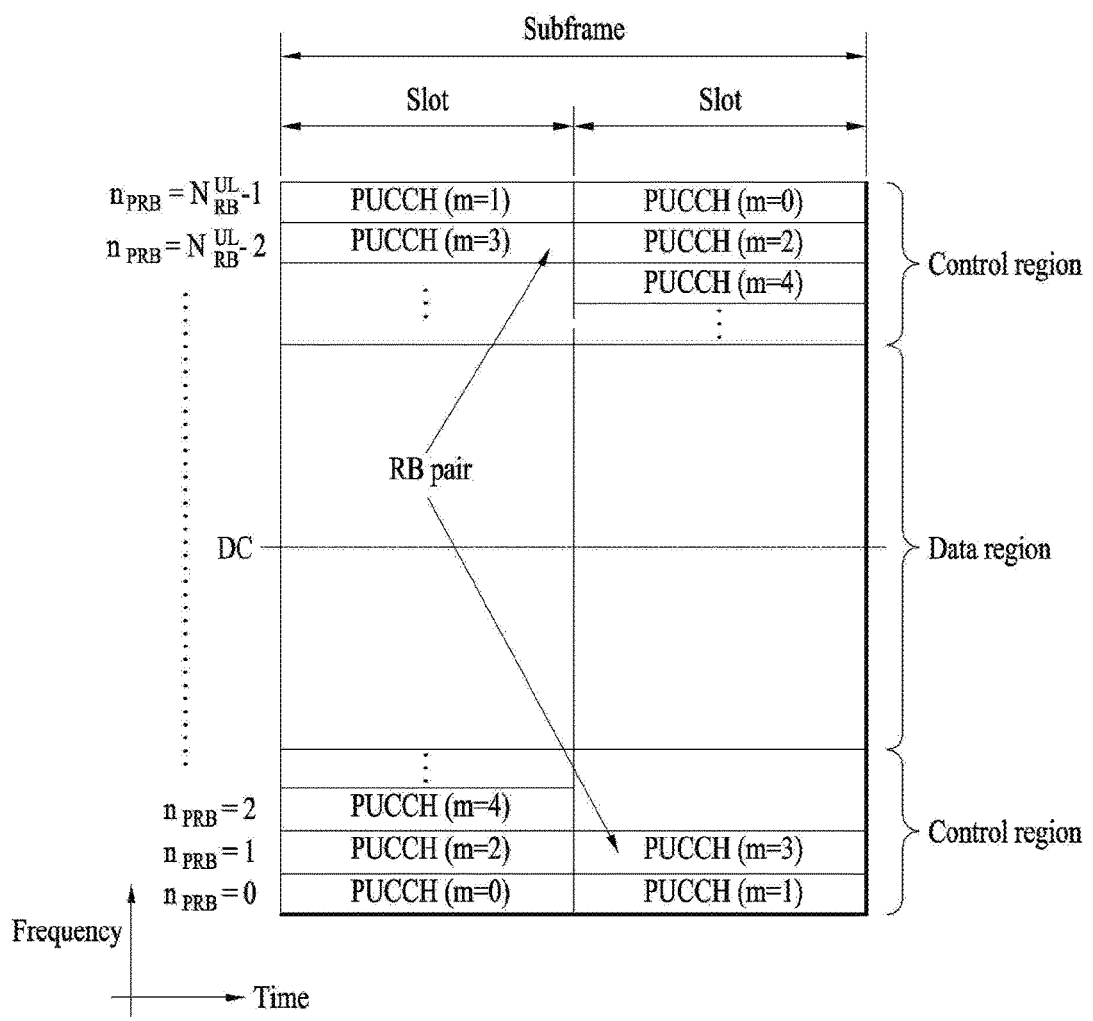
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In a next generation system, it may consider a situation that a TTI (transmission time interval) is variously configured for all or a specific physical channel to satisfy requirements in various application fields. More specifically, when communication is performed between an eNB and a UE, in order to reduce latency according to a scenario, it may be able to configure a TTI, which is used for transmitting such a physical channel as PDCCH (Physical Downlink Control CHannel), PDSCH (Physical Downlink Shared CHannel), PUSCH (Physical Uplink Shared CHannel), PUCCH (Physical Uplink Control CHannel), and the like, to be shorter than 1 msec. In the present specification, a channel of which the TTI is shorter than 1 msec can be referred to as sPDCCH, sPDSCH, sPUSCH, sPUCCH, respectively. And, a plurality of physical channels may exist in a single subframe (e.g., 1 msec) for a single UE or a plurality of UEs. In this case, each of a plurality of the physical channels may have a different TTI. In the following embodiments, for clarity, LTE system is explained as an example. In this case, a TTI corresponds to a size of a normal subframe in the LTE system and may correspond to 1 msec (hereinafter, a normal TTI). A short TTI corresponds to a TTI having a length shorter than the normal TTI. Each of the TTIs may correspond to a unit of a single OFDM symbol, a unit of a plurality of OFDM symbols, or a unit of an SC-FDMA symbol.

For clarity of explanation, a shortened TTI (i.e., a TTI shorter than a subframe (1 ms) in legacy LTE) is assumed. Yet, the principle of the present invention can be extensively applied to a case that a TTI becomes longer than a subframe or a length of a TTI is longer than 1 ms. And, it is apparent that the principle of the present invention is applicable to a different system (e.g., New RAT (new radio access technology)) rather than LTE. Specifically, the principle of the present invention can be applied to a system that introduces a shortened TTI in a form of increasing a subcarrier space. For clarity, the present invention is explained on the basis of LTE. Yet, corresponding contents of the present invention can also be applied to a technology using a different wave form/frame structure such as New RAT, and the like. In general, assume that a sTTI corresponds to a TTI having a length shorter than 1 msec, a long TTI corresponds to a TTI having a length of 1 msec, and a longer TTI corresponds to a TTI having a length longer than 1 msec in the present invention.

UL Structure with Shortened TTI

Figure 5:
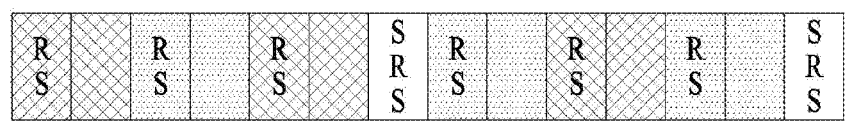
FIG. 5 is a diagram for an uplink symbol or a TTI structure according to one embodiment of the present invention.

When a sTTI is introduced, as a method of aligning a slot boundary defined in a legacy 1 ms TTI with a boundary of the sTTI, as shown in FIG. 5, it may consider a UL structure that the last symbol of each slot is configured by a symbol capable of transmitting an SRS. Referring to FIG. 5, each slot consists of 7 symbols and a slot consists of 3 sTTIs each of which consists of 2, 2, and 3 symbols.

More generally speaking, it may consider a UL structure that the last symbol of a plurality of sTTIs (or a single sTTI) within a prescribed time period is configured by a symbol capable of transmitting an SRS. Since the UL structure is configured by the fixed number of sTTIs within 1 ms, it may be able to configure a relatively simple HARQ timeline. As shown in FIG. 5, if an RS is located at the very first symbol of each sTTI, it enables faster decoding. And, since there is no sTTI over a slot boundary, it may have a merit in that it is able to easily perform multiplexing with a UL channel of a legacy TTI length.

Yet, when the last symbol of a slot is reserved as a symbol in which an SRS is transmitted, if it fails to transmit data at the last symbol of the slot, it may cause degradation of a data transfer rate or deterioration of reliability. In order to prevent this, it may be able to determine whether or not a UE transmits data and/or an SRS at the symbol reserved as a symbol capable of transmitting an SRS through a dynamic control signal (e.g., DCI) and/or an upper layer signal.

As mentioned in the foregoing description, if data transmission is permitted at the symbol reserved as a symbol capable of transmitting an SRS, it may be able to define a rule to perform RE mapping according to a frequency first time second scheme in a frequency resource scheduled by a UL grant. For example, referring to FIG. 5, if data transmission is permitted at a $7^{th}$ symbol, RE mapping is performed on data scheduled by $3^{rd}$ TTI at 3 symbols according to the frequency first and time second scheme.

Specifically, if an SRS is triggered by an SRS request field belonging to PDCCH (i.e., sPDCCH) for transmitting/scheduling data within a sTTI, it may be able to define a rule that SRS transmission is triggered for a symbol capable of transmitting an SRS only among the remaining symbols except the last symbol of a subframe. And, it may be able to define a rule that SRS transmission for a symbol capable of transmitting an SRS among the remaining symbols except the last symbol of a subframe is restricted to a trigger type 1 based SRS transmitted via a dynamic control signal (e.g., DCI). By doing so, it may be able to prevent degradation of a transfer rate caused by an excessive periodic SRS configuration.

An SRS transmission subframe for the trigger type 1 SRS corresponds to a (cell-specific) SRS subframe and an n+k ($k \geq 4$)$^{th}$ subframe on the basis of an $n^{th}$ subframe. The SRS transmission subframe can be defined by a subframe satisfying a condition given by an equation described in the following.

$$(10n_f + k_{SRS} + T_{offset,1}) \bmod T_{SRS,1} = 0 \qquad \text{[Equation 1]}$$

In this case, of corresponds to a system number (0 to 1023), $k_{SRS}$ corresponds to a subframe index in a radio frame, and $T_{offset,1}$ corresponds to an SRS subframe offset for a trigger type 1.

Irrespective of a configuration for determining legacy SRS transmission, a configuration for determining SRS transmission for the remaining symbols capable of transmitting an SRS except the last symbol of a subframe can be configured through an upper layer signal. Specifically, the configuration may correspond to information corresponding to "SRS Subframe Configuration", "SRS configuration index", and the like. In this case, the configuration can be independently configured according to a TTI length.

And, irrespective of the configuration for determining legacy SRS transmission, a configuration for determining an SRS transmission frequency resource for the remaining symbols capable of transmitting an SRS except the last symbol of a subframe can be configured through a upper layer signal. Specifically, the configuration may correspond to information corresponding to "SRS bandwidth Configuration", "SRS bandwidth", "SRS hopping bandwidth", "Frequency domain position", "transmission comb", and the like. In this case, the configuration can be independently configured according to a TTI length.

Figure 6:
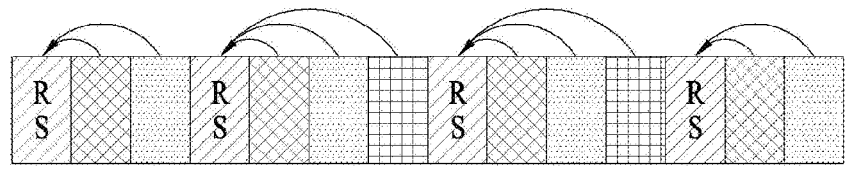
FIG. 6 is a diagram for a plurality of data symbols sharing a common reference signal or a TTI structure according to one embodiment of the present invention.

In order to more reduce RS overhead, it may consider a UL structure including a plurality of data symbols and sharing an RS symbol for demodulating a plurality of the data symbols within a prescribed time period. FIG. 6 shows a UL structure consisting of a plurality of data symbols that share an RS symbol. Although FIG. 6 shows a case that one sTTI consists of 3 or 4 symbols, this is an example only. One sTTI can be configured by one or more symbols.

In this case, a symbol capable of transmitting an RS can be dynamically changed. An RS transmission symbol can be determined via a dynamic control signal (e.g., DCI). In this case, it may be able to define a rule that UL grant DCI for scheduling a specific sTTI indicates an order of a symbol or a sTTI at which a data symbol is to be transmitted.

Specifically, when a specific sTTI is scheduled, it may be able to indicate an order of a symbol or a sTTI at which the scheduling is performed from an RS transmission symbol via a bitmap. For example, when the information is configured by a bitmap of 3 bits and each of the 3 bits means scheduling on a sTTI #n, a sTTI #n+1, and a sTTI #n+2, respectively, in order to schedule the sTTI #n+1, a value of the bitmap can be indicated by '010'. Having received the information, a UE transmits an RS and may be then able to transmit data at the timing corresponding to the indicated sTTI. As a different method, it may be able to explicitly indicate an order of a symbol or a sTTI at which scheduling is performed from an RS transmission symbol in a sTTI unit, a symbol unit, or a predetermined time unit.

Figure 7:
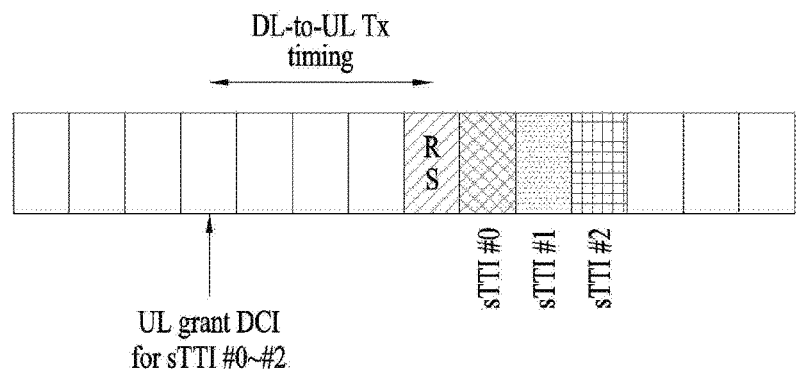
FIG. 7 is a diagram for a time interval between uplink grant control information and a reference signal according to one embodiment of the present invention.

If the UL structure is introduced, it may be able to define rule that an RS is transmitted after defined/promised or signaled time corresponding to "DL-to-UL Tx timing" is elapsed from UL grant DCI transmission timing. For example, if the "DL-to-UL Tx timing" is configured by 4 symbols, as shown in FIG. 7, transmission timing of an RS for UL grant DCI at a $4^{th}$ symbol corresponds to an $8^{th}$ symbol. In addition, it may be able to define a rule that a first sTTI starts after predefined/promised or signaled timing is elapsed from timing at which an RS is transmitted.

As a further different method, it may be able to define a rule that information on whether or not data and an RS are transmitted together is explicitly (or implicitly) indicated by a sTTI scheduled by a specific field belonging to UL grant DCI. For example, if UL grant DCI for a sTTI #n indicates to transmit an RS in a corresponding sTTI and UL grant DCI for a sTTI #n+1 and a sTTI #n+2 indicates not to transmit an RS in a corresponding sTTI, a UE can transmit a data symbol only without transmitting an RS symbol for the sTTI #n+1 and the sTTI #n+2.

Figure 8:
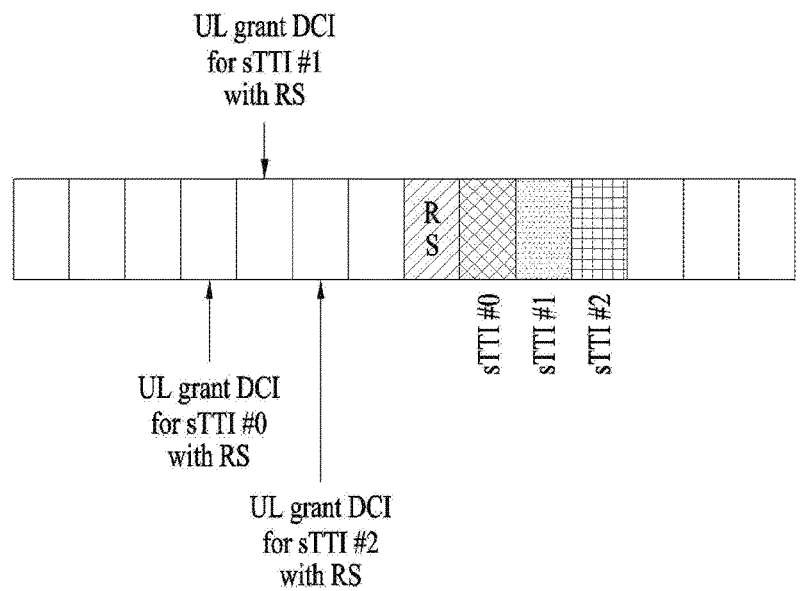
FIG. 8 is a diagram for uplink grant control information for scheduling a symbol/TTI in which a reference signal and data are transmitted, a symbol/TTI in which data is transmitted only, and a corresponding symbol/TTI.

Or, as shown in FIG. 8, the "DL-to-UL Tx timing" can be configured by a predefined different value depending on whether a data is scheduled only or an RS and a data are scheduled together at a sTTI scheduled by UL grant DCI.

The number of data symbols or the number of sTTIs capable of being associated with an RS can be defined/provided in advance or can be set to a UE via an upper layer signal or a physical layer signal.

And, it is necessary to change sPUCCH structure.

If a subframe is configured by 6 sTTIs having a {3, 2, 2, 2, 2, 3} symbol unit, a DM-RS of sPUCCH can be positioned at a first symbol of every sTTI. In particular, the above structure may correspond to a structure for fast decoding of an eNB. For example, data in a subframe of 2/3-symbol sPUCCH and a DM-RS symbol configuration can be defined as [R D D/R D/R D/R D/R D/R D D]. In this case, R corresponds to a symbol in which a DM-RS is transmitted and D corresponds to a symbol in which data is transmitted.

If power transient of a sTTI is defined by the outside of the sTTI to minimize performance deterioration of the sTTI, when the last sTTI of a subframe #n and the first sTTI of a subframe #n+1 are continuously transmitted, a power transient period of a specific sTTI is overlapped with an on mask period of the remaining sTTI, thereby causing performance deterioration. In order to prevent the performance deterioration, data in a subframe of 2/3-symbol sPUCCH and a DM-RS symbol configuration can be defined as [D R D/R D/R D/R D/R D/R D D] or [D D R/R D/R D/R D/R D/R D D]. Specifically, it may be able to define a rule that a DM-RS symbol is positioned at a second or a third symbol rather than a first symbol in a corresponding sTTI at the first sTTI of a subframe.

It may be able to configure a UE to use one of the aforementioned patterns for sPUCCH transmission via an upper layer signal. Or, it may set a length value of a power transient period to the UE and configure the UE to use one of the aforementioned patterns for sPUCCH transmission according to the value. Or, it may configure a length value of a power transient period and it may be then able to differently configure a DM-RS per sTTI according to the length value of the power transient period. More generally speaking, a DM-RS position per sTTI of sPUCCH can be indicated/configured via an upper layer signal or a physical layer signal.

Figure 9:
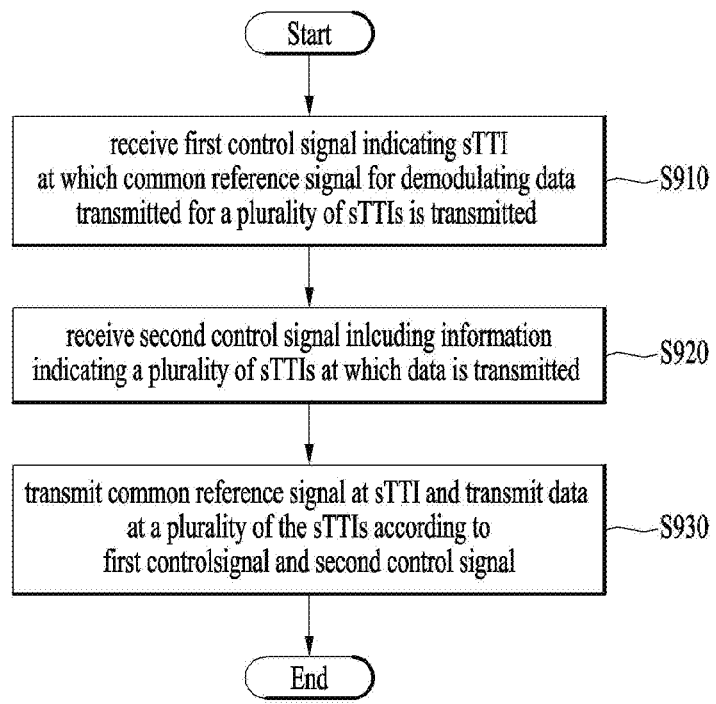
FIG. 9 is a flowchart for an operation of a UE according to one embodiment of the present invention.

FIG. 9 shows an operation according to one embodiment of the present invention.

FIG. 9 relates to a method of transmitting uplink in a wireless communication system. The method may be performed by a terminal. The terminal may receive a first control signal indicating a shortened TTI (sTTI) at which a common reference signal, which is used for demodulating data, among a plurality of sTTIs [S910]. The terminal may receive a second control signal including information indicating a plurality of the sTTIs at which the data is transmitted [S920]. Subsequently, the terminal may transmit the common reference signal and the data at the sTTI and a plurality of the STTIs, respectively, according to the first control signal and the second control signal [S930].

The sTTI at which the common reference signal is transmitted may be configured to be after a predetermine time is elapsed from a time instance at which the second control signal for scheduling the transmission of the data is received.

A length of the predetermined time may be determined according to whether or not the data is transmitted at the sTTI at which the common reference signal is transmitted.

The second control signal may include bitmap information indicating a sTTI at which the data is transmitted among n sTTIs after the sTTI at which the reference signal is transmitted, where n is an integer greater that or equal to one.

The second control signal may further include information indicating whether or not the data and the common reference signal are transmitted together.

The number of sTTIs associated with the common reference signal can be configured in advance.

So far, the embodiments of the present invention are briefly explained with reference to FIG. 9. The embodiment related to FIG. 9 can alternatively or additionally include at least a part of the aforementioned embodiment(s).

Figure 10:
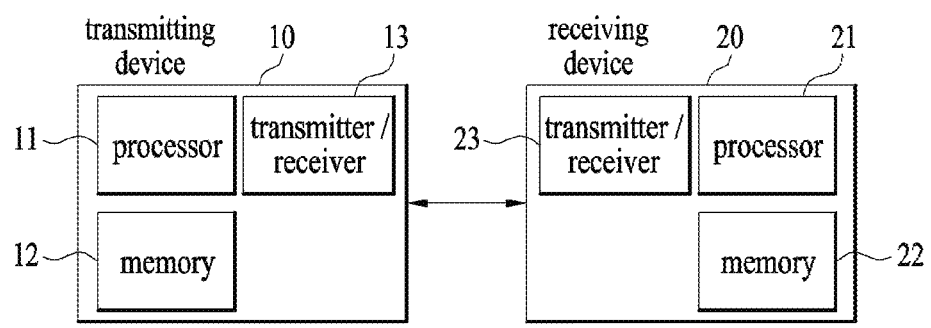
FIG. 10 is a block diagram for a device for implementing embodiment(s) of the present invention.

FIG. 10 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

What is claimed is:

1. A method for a terminal to transmit uplink transmission in a wireless communication system, the method comprising:
receiving, by the terminal, a first control signal informing a shortened transmission time interval (sTTI) or a symbol position in which a reference signal for demodulating data transmitted in a plurality of sTTIs is transmitted;
receiving, by the terminal, a second control signal containing information informing the plurality of sTTIs in which the data is transmitted; and
transmitting, by the terminal, the reference signal in the informed sTTI or symbol position and transmitting the data in the plurality of sTTIs according to the first control signal and the second control signal, wherein the reference signal is common for the data transmitted in the plurality of sTTIs, and wherein the second control signal includes an interval of a sTTI unit or a symbol unit between the sTTI or symbol position in which the reference signal is transmitted and the plurality of sTTIs.

2. The method of claim 1, wherein the sTTI or symbol position in which the reference signal is transmitted is configured to be after a predetermined time is elapsed from a time instance at which the second control signal for scheduling a transmission of the data is received.

3. The method of claim 2, wherein a length of the predetermined time is determined according to whether or not the data is transmitted together with the reference signal at the sTTI or symbol position in which the reference signal is transmitted.

4. The method of claim 1, wherein the second control signal further includes bitmap information indicating a sTTI at which the data is transmitted among n sTTIs after the sTTI in which the reference signal is transmitted, wherein n is an integer greater than or equal to one.

5. The method of claim 1, wherein the second control signal further comprises information indicating whether or not the data is transmitted together with the reference signal.

6. The method of claim 1, wherein a number of the plurality of sTTIs associated with the reference signal is configured in advance.

7. A terminal for uplink transmission in a wireless communication system, the terminal comprising:

a transmitter and a receiver of the terminal; and a processor of the terminal configured to control the transmitter and the receiver, wherein the processor is further configured to:

receive a first control signal informing a shortened transmission time interval (sTTI) or a symbol position in which a reference signal for demodulating data transmitted in a plurality of sTTIs is transmitted, receive a second control signal containing information indicating informing the plurality of sTTIs in which the data is transmitted, transmit the reference signal in the informed sTTI or symbol position and transmit the data in the plurality of sTTIs according to the first control signal and the second control signal, wherein the reference signal is common for the data transmitted in the plurality of sTTIs, and wherein the second control signal includes an interval of a sTTI unit or a symbol unit between the sTTI or symbol position in which the reference signal is transmitted and the plurality of sTTIs.

8. The terminal of claim 7, wherein the sTTI or symbol position in which the reference signal is transmitted is configured to be after a predetermined time is elapsed from a time instance at which the second control signal for scheduling a transmission of the data is received.

9. The terminal of claim 8, wherein a length of the predetermined time is determined according to whether or not the data is transmitted together with the reference signal at the sTTI or symbol position in which the reference signal is transmitted.

10. The terminal of claim 7, wherein the second control signal further includes bitmap information indicating a sTTI at which the data is transmitted among n sTTIs after the sTTI or symbol position in which the reference signal is transmitted, wherein n is an integer greater than or equal to one.

11. The terminal of claim 7, wherein the second control signal further comprises information indicating whether or not the data is transmitted together with the reference signal.

12. The terminal of claim 7, wherein a number of the plurality of sTTIs associated with the reference signal is configured in advance.

* * * * *